Feb. 15, 1944.  R. M. MAGNUSON  2,342,001
PRESSURE REGULATOR
Filed Oct. 17, 1941
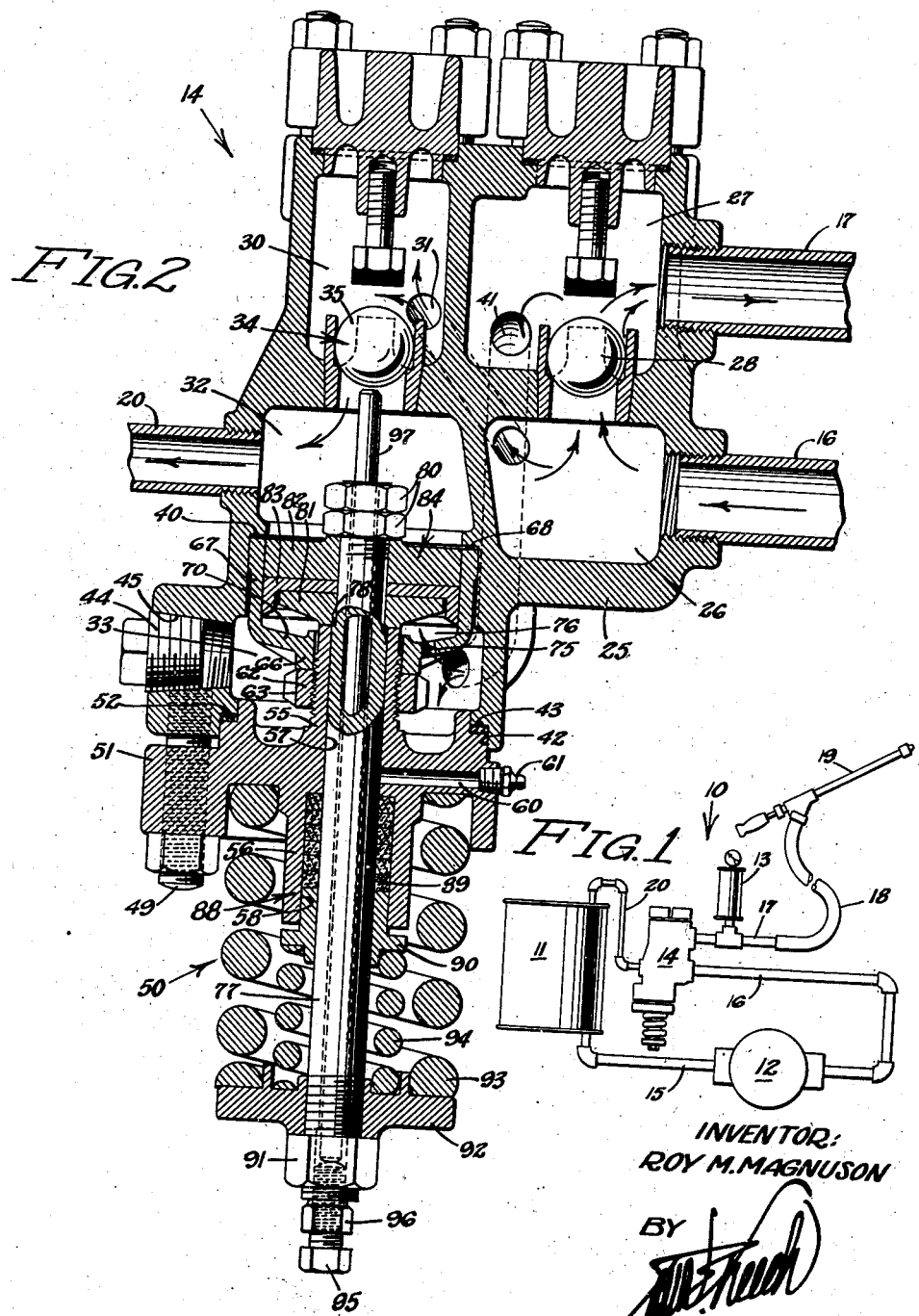
INVENTOR:
ROY M. MAGNUSON
BY
ATTORNEY Patented Feb. 15, 1944

2,342,001

UNITED STATES PATENT OFFICE 2,342,001

PRESSURE REGULATOR

Roy M. Magnuson, Campbell, Calif., assignor to Food Machinery Corporation, San Jose, Calif., a corporation of Delaware Application October 17, 1941, Serial No. 415,341

10 Claims. (Cl. 60—54.6)

This invention relates to pressure regulators and particularly to devices for regulating the pressure of liquids delivered under high pressure to spray rigs and the like.

It is an object of the invention to provide an improved fluid pressure regulator in which the pressure responsive mechanism may be assembled with the regulator with facility and precision.

Pressure regulators of the type to which this invention relates embody a mechanism which is responsive to fluid back pressure, when this reaches a certain critical value, to operate a by-pass valve or the like. The fluid responsive mechanism in the regulator is preferably controlled from the outside of the regulator to determine the pressure at which this mechanism will function. This control is generally effected through a stem extending outwardly through a stuffing box in the body of the regulator. A change in the adjustment of this mechanism results in a corresponding change in the fluid pressure within the regulator. There is a tendency for the stuffing box about said stem to leak when the interior pressure is increased unless the stuffing box is adjusted to take care of this increased pressure.

It is yet another object of my invention to provide a fluid pressure regulator in which it is unnecessary to give attention to the adjustment of the stuffing box aforesaid when adjusting the fluid pressure responsive mechanism in order for the stuffing box to be accommodated to an increased interior fluid pressure resulting therefrom.

The manner of accomplishing the foregoing objects, as well as further objects and advantages, will be made manifest in the following description taken in connection with the accompanying drawing, in which:

Fig. 1 is a diagrammatic illustration of a spray rig outfit showing one manner in which the regulator of my invention is adapted to be used.

Fig. 2 is an enlarged sectional view of a preferred embodiment of the invention.

Referring specifically to the drawing, Fig. 1 illustrates diagrammatically a spray rig apparatus 10 including a liquid supply tank 11, a high pressure pump 12, an air cushion tank 13 and a pressure regulator 14. The pump 12 draws liquid from the supply tank 11 through a pipe 15 and delivers this through a pipe 16 to the regulator 14. From here the liquid is delivered through a spray line pipe 17 to a hose 18 leading to one or more spray nozzles 19. The pipe 17 connects with the air cushion tank 13 for a purpose to be made clear hereinafter. The regulator 14 has a by-pass pipe 20. When the pressure in the line 17 rises above a given value the regulator 14 causes the excess liquid supplied thereto from the pump 12, through the pipe 16, to return to the liquid supply tank 11 through the pipe 20.

The regulator 14 has a body 25 including a chamber 26, into which the pipe 16 delivers liquid and a chamber 27, from which liquid is delivered to the pipe 17. Provided between the chambers 26 and 27 is a check valve 28 which permits liquid to flow freely from the chamber 26 into the chamber 27 and prevents its flow in the reverse direction. The body 25 also has a chamber 30 which is connected with the chamber 26 by a passage 31, this passage being diagrammatically illustrated in Fig. 2, and in actual practice being much larger than shown. The body 25 also has chambers 32 and 33, there being a by-pass valve 34 including a valve ball 35 disposed between the chambers 30 and 32 and preventing a flow of liquid from the chamber 30 to the chamber 32 excepting when said ball 35 is lifted.

The chamber 32 connects with the by-pass pipe 20, and prior to the assembly of the regulator 14 this chamber connects with chamber 33, there being an annular seat 40 formed about the upper end of the chamber 33 where this joins the chamber 32. The chamber 27 is connected with the chamber 33 by a passage 41 provided in the body 25. The chamber 33 has a mouth 42 provided with a seat 43. Access to the chamber 33 when the regulator 14 is assembled is provided by a screw plug 44 mounted in a suitable hole 45 provided in the body. The body 25 is also provided with stud bolts 49 by which a pressure responsive unit 50 is assembled with the rest of the regulator.

The unit 50 includes a base 51 which fits into the mouth 42 of the chamber 33, compresses packing 52 against the seat 43, and acts as a closure for this chamber. When looking at the regulator 14 as when assembled, the base 51 may be considered either as a closure for the chamber 33 or as a part of the body 25.

The closure 51 has an externally threaded internal boss 55 and an external boss 56. A central bore 57 having an outer counter bore 58 extends axially through these bosses. Connecting with the bore 57 is a lubricating channel 60 having a check valve Zerk fitting 61.

Screwed on to the threaded boss 55 is a nut 62 having teeth 63. Also surrounding the boss 55 above the nut 62 is the hub 66 of a cylinder 67. This cylinder is adapted to be lifted by rotation of the screw 62 so that the upper end of the cylinder compresses packing 68 against the seat 40 and makes a fluid-tight seal between said cylinder and said seat. The cylinder 67 is connected with its hub 66 by a bottom wall 70, there being one or more holes 75 in this wall to permit the passage of fluid from the chamber 33 into the chamber 76 within the cylinder 67.

Slidable in the bore 57 of the closure 51 is a hollow valve stem 77 which is turned down to provide a shoulder 78 near its upper end and is externally threaded at its upper and lower ends and internally threaded at its lower end. Surrounding the upper end portion of the stem 77, and held against the shoulder 78 by nuts 80, are washers 81 and 82 and a flexible packing cup 83. The washers 81 and 82 and cup 83 form a pressure differential responsive piston 84, which slidably fits in the cylinder 67.

Provided in the counter bore 58 is a stuffing box 88, this including packing 89 and a gland 90. Surrounding the lower end of the stem 77, and adjustably held thereon by a nut 91, is a spring cap 92, this cap trapping an expansive coil spring 93 between this cap and the closure 51. Disposed within the spring 93 and trapped between the cap 92 and the gland 90 is a smaller expansive coil spring 94.

Screwed into the lower end of the stem 77 is a cap screw 95, this being held in a fixed adjustment by a lock nut 96 to support a by-pass valve rod 97 within the stem 77. The upper end of this rod extends from the upper end of the stem 77 to a point just below the ball 35 of the by-pass valve 34.

*Operation*

In assembling the regulator 14 and the apparatus 10, in preparation for operating the latter, a grease gun is applied to the Zerk fitting 61 and a sufficient quantity of grease forced therein so that this will flow upwardly around the stem 77 and between the upper end of the boss 55 and the washer 81 to substantially fill the chamber 76 with grease. The nut 91 is also adjusted to compress the spring 93 sufficiently to produce that downward tension on the stem 77 which will make it necessary for the desired pressure differential between the liquids in the chamber 33 and the chamber 32 to exist before the piston 84 will be lifted so as to open the by-pass valve 34. The height of the rod 97 in the stem 77 is also adjusted by means of manipulating the screw 95 and nut 96 so as to give the required degree of sensitiveness of the regulator 14 in response to the building up of back pressures in the chamber 27.

The apparatus 10 is now placed in operation by filling the tank 11 with liquid to be sprayed and starting the pump 12 which is allowed to run continuously. The spray nozzles 19 are not kept open constantly as it is necessary to shut these off when moving from tree to tree or from one job to another or for other reasons. When the nozzles 19 are shut off there is immediately a rapid increase in the pressure in the chambers 26 and 27, this pressure being transmitted from the latter through the passage 41 to the chamber 33 and thence through the opening 75 to the cylinder chamber 76. When this pressure becomes sufficient so that when exerted against the bottom of the piston 84 it lifts this and further compresses the springs 93 and 94, the rod 97 engages the ball 35 thus opening the by-pass valve 34 and allowing liquid to flow from the chamber 26 through the passage 31 into the chamber 30 and from this through the valve 34 into the by-pass chamber 32 and out to the tank 11 through the pipe 20.

When this happens the pressure in the chamber 26 becomes lower than the fluid pressure in the chamber 27 resulting in reversal of flow which immediately closes the check valve 28 thereby maintaining the excessive pressure in the chamber 27 which, transmitted through the passage 41, holds the piston 84 up and the by-pass valve 34 open until the pressure in the chamber 27 is released as by opening one of the nozzles 19. Immediately upon this being done of course the excessive pressure holding the piston 84 up and the by-pass valve 34 open subsides with the result that this valve immediately closes and liquid pumped into the chamber 26 passes upwardly through the check valve 28 and out of the chamber 27 through the pipe 17.

In my co-pending application for U. S. Letters Patent, Ser. No. 333,521 filed May 6, 1940, for a Pressure regulating means, I have disclosed and claimed certain features also embodied in the device disclosed herein. The novel features which it is intended to claim in this invention relate particularly to the pressure responsive unit 50. It is to be noted that this unit contains most of the working parts of the regulator 14 and the parts thereof are adapted to be added to or taken from the regulator as a unit. This is of great importance in that it permits easy servicing of the regulator 14 in the field which can be accomplished merely by replacing the unit 50 with a new unit and sending the old unit into a shop to be repaired. Difficulty has heretofore been experienced in removing the pressure responsive valve cylinders from these regulators, as it was previously necessary that these have a pressed fit in the body in order to provide a fluid-tight fit between the cylinder and the body. In the present invention such a pressed fit is unnecessary as the unit 50 may be inserted into the body 25 with the nut 65 turned down somewhat on the boss 55 and after the closure 51 has been tightly fastened to the body 25 to close the mouth 42 of the chamber 43, the plug 44 can be removed and by engaging the teeth 66 through the hole 45 with a suitable tool, the nut 65 can be rotated to lift the cylinder 67 to tightly compress the packing 68 between this cylinder and the shoulder 40. By this method a fluid-tight fit is assured between this cylinder and the body 25 without making it difficult to remove the cylinder from the body when it is desired to remove this for the purpose of repairs. To effect this purpose the cylinder 67 slides sufficiently freely in the upper portion of the chamber 33 that when the nuts are taken from the sub-bolts 49 the entire unit 50 drops readily downwardly away from the rest of the regulator 14.

Another important feature of the invention is the automatic provision made for varying the tightness of the stuffing box 88 in accordance with the pressure differential for which the unit 50 is set to operate. As before described, this results from the compression of the spring 94 being altered correspondingly as the pressure of the spring 93 is altered in adjusting the unit 50 for operation at a different differential of pressures at opposite faces of the piston 84. In other words, the pressure in the chamber 33 must be considerably higher in order to operate the piston 84 to open the by-pass valve 34 so that when such a pressure builds up in the chamber 33 it tends to force grease downwardly between the stem 77 and the closure bore 57. The stuffing box 88 is tightened accordingly so as to prevent this liquid discharge around the stem 77.

What I claim is:

1. In a pressure regulator, the combination of: a body having a cylinder receiving chamber; a removable closure for said chamber; a cylinder adapted to be received by said chamber; means operable, after said closure has been applied, to engage said closure and press said cylinder against said body in said chamber; a piston slidable in said cylinder; a piston stem extending through said closure and said pressure means to connect with said piston; a stuffing box provided on said closure with a gland for pressing packing about said stem; expansive spring means constrained between said closure and said stem to yieldably hold said piston against movement in said cylinder in a given direction; and separate expansive spring means constrained between said gland and said stem to press said packing about said stem.

2. In a pressure regulator, the combination of: a body having a cylinder receiving chamber; a removable closure for said chamber; a cylinder adapted to be received by said chamber; means operable, after said closure has been applied to engage said closure and press said cylinder against said body in said chamber; a piston slidable in said cylinder; a piston stem extending through said closure and said pressure means to connect with said piston; a stuffing box provided on said closure with a gland for pressing packing about said stem; expansive spring means constrained between said closure and said stem to yieldably hold said piston against movement in said cylinder in a given direction; separate expansive spring means constrained between said gland and said stem to press said packing about said stem; and unitary means on said stem for coordinately adjusting the tension of said two spring means.

3. In a pressure regulator, the combination of: a body having a cylinder receiving chamber, there being an annular seat provided in the latter; a cylinder adapted to be received by said chamber; a removable closure for said chamber; a threaded boss provided internally on said closure; a nut threadedly received on said boss; and means for giving access to said chamber while said closure is applied to said body for rotation of said nut to apply pressure to said cylinder to hold the latter in sealing relation with said seat.

4. In a pressure regulator, the combination of: a body having a cylinder receiving chamber, there being an annular seat provided in the latter; a cylinder adapted to be received by said chamber; a removable closure for said chamber; a threaded boss provided internally on said closure; a nut threadedly received on said boss; means for giving access to said chamber while said closure is applied to said body for rotation of said nut to apply pressure to said cylinder to hold the latter in sealing relation with said seat; a fluid pressure responsive element confining the space within said cylinder and responsive to fluid under pressure therein, said boss being coaxial with said cylinder and having a central bore which extends through said closure; a stuffing box formed in the outer end of said bore; and a stem connecting with said element and extending outwardly through said bore and said stuffing box.

5. In a pressure regulator, the combination of: a body having a cylinder receiving chamber, there being an annular seat provided in the latter; a cylinder adapted to be received by said chamber; a removable closure for said chamber; a threaded boss provided internally on said closure; a nut threadedly received on said boss; means for giving access to said chamber for rotation of said nut to apply pressure to said cylinder to hold the latter in sealing relation with said seat; a fluid pressure responsive element confining the space within said cylinder and responsive to fluid under pressure therein, said boss being coaxial with said cylinder and having a central bore which extends through said closure; a stuffing box formed in the outer end of said bore; a stem connecting with said element and extending outwardly through said bore and said stuffing box; adjustable spring means provided on said closure and engaging said stem to determine pressure of fluid on said cylinder to which said element will respond; and means responsive to adjustment of the aforesaid spring means to correspondingly alter the resistance of said stuffing box to the escape of fluid around said stem.

6. In a pressure regulator, the combination of: a body having chambers for receiving fluid; a fluid pressure responsive element disposed between said chambers and responsive to a differential of pressure of fluids in said chambers, there being a bore in said body; a stuffing box provided in the outer end of said bore; means for applying pressure to said stuffing box; a stem connected with said element and extending outwardly through said bore and stuffing box; adjustable spring means provided on said body and engaging said stem to determine that differential of fluid pressure in said chambers to which said element will respond; and means for adjusting said spring means to cause said element to respond to a different differential of pressure and simultaneously adjust said pressure means to make a corresponding change in the tightness of said stuffing box.

7. In a pressure regulator, the combination of: a body having chambers for receiving fluid; a fluid pressure responsive element disposed between said chambers and responsive to a differential of pressure of fluids in said chambers, there being a bore in said body; a stuffing box provided in the outer end of said bore; a stem connected with said element and extending outwardly through said bore and stuffing box, said stuffing box containing packing and including a gland for compressing said packing about said stem; a spring cap on the outer end of said stem; a coiled expansive spring disposed between said body and said cap; a second coiled expansive spring within the first and disposed between said cap and said gland; and means on said stem for adjusting the position of said cap thereon to vary the tension of said springs.

8. In a pressure regulator the combination of: a body having a chamber for receiving fluid under pressure; a fluid pressure-responsive element disposed to confine said fluid in said chamber and thereby be subject to the pressure of said fluid, there being a bore in said body connecting with said chamber; a stuffing box provided in the outer end of said bore; a stem connected with said element and extending outwardly through said bore and stuffing box, said stuffing box containing packing and including a gland for compressing said packing about said stem; spring means for pulling outwardly on said stem thereby resisting response of said element to said pressure; a secondary spring means for applying pressure to said gland and through this to said packing; and unitary means for coordinately increasing or decreasing the tension of both of said spring means.

9. In a pressure regulator the combination of: a body having a chamber for receiving fluid under pressure; a fluid pressure-responsive element disposed to confine said fluid in said chamber and thereby be subject to the pressure of said fluid, there being a bore in said body connecting with said chamber; a stuffing box provided in the outer end of said bore; a stem connected with said element and extending outwardly through said bore and stuffing box, said stuffing box containing packing and including a gland for compressing said packing about said stem; a spring cap on the outer end of said stem; a coiled expansion spring disposed between said body and said cap; a second coiled expansion spring within the first and disposed between said cap and said gland; and means on said stem for adjusting the position of said cap thereon to vary the tension of said springs.

10. A pressure-responsive unit adapted to be assembled on a pressure regulator body to function in response to fluid delivered under pressure to a chamber provided in said body, said unit comprising: a fluid pressure-responsive element adapted to be inserted into said chamber; a closure for said chamber there being a bore in said closure; a stem connecting with said pressure-responsive element and extending through said bore to the exterior of said closure; means on said closure forming a stuffing box about said stem containing packing and including a gland for compressing said packing; means for applying yieldable forces to said gland to compress said packing and to said stem to pull the same outwardly through said bore and thereby resist response of said element to said fluid pressure; and means for coordinately increasing or decreasing said forces.

ROY M. MAGNUSON.